Patented Nov. 7, 1933

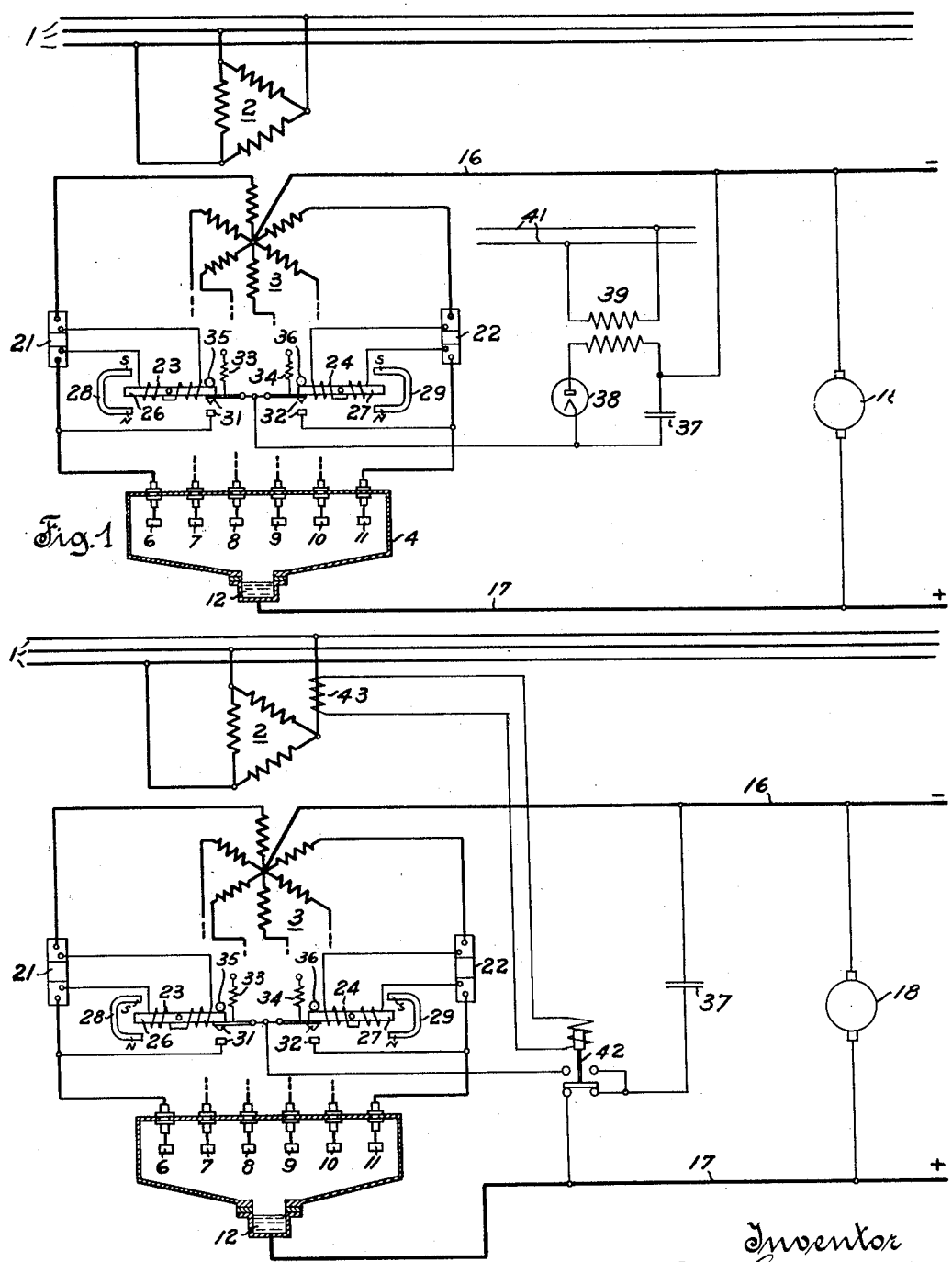

1,933,849

UNITED STATES PATENT OFFICE 1,933,849

ELECTRIC CURRENT RECTIFYING SYSTEM

Arthur Gaudenzi, Baden, Switzerland, assignor to Aktiengesellschaft Brown Boveri & Cie., Baden, Switzerland, a joint-stock company of Switzerland Application January 28, 1932, Serial No. 589,412, and in Germany January 30, 1931

4 Claims. (Cl. 175—363)

This invention relates to improvements in electric current rectifying systems and particularly to such system employing an electric current rectifier of the metallic vapor arcing type having associated therewith means for quenching the arc within such rectifier upon the occurrence of a flow of reverse current in the rectifier.

In an electric current rectifier of the metallic vapor arcing type, the arcs flow from the anodes to the cathode during normal operation. Attempts have been made to quench the arcs within a rectifier by quenching the cathode spot to which the arcs attach by the use of a condenser. The discharge current of the condenser reduces the arc currents to zero whereupon the arcs disappear. If the direction of flow of the arcs change within the rectifier by reason either of a back-fire or a short circuit between the anodes thereof, the anode to which an arc is flowing acts as a cathode. The current flowing in such backfire or short circuit is maintained by the arcs from the other anodes to the cathode and from direct current sources connected in parallel with the rectifier. Such back-fires or short circuits continue until a switch connecting the transformer supplying the rectifier from a source of alternating current opens and disconnects the rectifier from the alternating current supply line.

It is, therefore, among the objects of the present invention to provide an electric current rectifying system employing an electric current rectifier of the metallic vapor arcing type having associated therewith means for interrupting a back-fire or short circuit therein within one cycle of the alternating current supply without disconnection of the rectifier from the alternating current circuit or the direct current circuit supplied thereby.

Another object of the invention is to provide an electric current rectifying system in which a condenser is associated with an electric current rectifier of the metallic vapor arcing type for the purpose of quenching an arc within the rectifier upon the occurrence of a back-fire or short circuit therein.

Another object of the invention is to provide an electric current rectifying system in which a charged condenser is arranged to impress an opposing voltage to a back-firing or short circuiting anode of an electric current rectifier of the metallic vapor arcing type whereby the back-fire or short circuit current is interrupted within one cycle.

Objects and advantages other than those above set forth will be apparent from the following description when read in connection with the accompanying drawing, in which:

Figure 1 diagrammatically illustrates a portion of an electric current rectifying system employing an electric current rectifier of the metallic vapor arcing type having associated therewith a condenser charged from a suitable source of alternating potential for the purpose of quenching arcs within the rectifier; and Figure 2 diagrammatically illustrates a modified embodiment of the present invention similar to that illustrated in Figure 1 excepting that the condenser is charged from the direct current output circuit and is provided with means for connecting the condenser with an anode upon the occurrence of an overload on the primary winding of the transformer supplying the rectifier with alternating current.

Referring more particularly to the drawing by characters of reference, the reference numeral 1 designates an alternating current supply line connected with the primary winding 2 of a transformer, of which the secondary winding 3 is connected with an electric current rectifier of the metallic vapor arcing type comprising a container having a plurality of anodes 6, 7, 8, 9, 10, and 11, extending thereinto and retaining a pool of vaporizable material, such as mercury, forming a cathode 12. The rectifier supplies a direct current circuit comprising a negative bus bar 16 connected with the neutral point of the transformer secondary winding 3 and a positive bus bar 17 connected with the cathode 12; the bus bars supplying current to direct current consuming devices such as indicated at 18.

A shunt as at 21 and 22 is connected into the conductor connecting each of the anodes 6 etc. with the several coils forming the secondary winding 3 of the supply transformer for the purpose of supplying the operating coils or polarized relays each comprising a coil 23 or 24, an armature 26 or 27 and a permanent magnet 28 or 29. Although relays have been shown in only two of the anode connections with the transformer for the sake of simplicity and clearness in the drawing, it will be understood that a similar relay is connected with each of such anode connections. The structure of the polarized relays has been shown diagrammatically for the reason that any polarized relay of known construction may be used. The armatures 23 or 24 of the relay are arranged to close a pair of contacts 31 and 32 which are normally retained in the separated or open position by suitable means such as springs 33 or 34 by which the armatures of the relays are held against stops 35 or 36. The fixed contact of each of the pairs of contacts is connected with the conductor supplying current to the operating coil of the relay arranged to close the respective contacts, and the movable contacts of the several pairs of contacts are inter-connected by a flexible connector. The movable contacts are connected with a circuit including a condenser 37 and an electric valve 38 supplied with potential through a transformer 39 from a source 41 of suitable potential. It will be understood that transformer 39 may be connected with a portion of the supply transformer secondary winding 3 or may be supplied from any other suitable source of alternating potential. The positive plate of the condenser 37 is connected with the flexible connection between the movable contacts and the negative plate of the condenser is connected with the direct current circuit. The condenser is continuously charged from the transformer 39 through the valve 38.

During normal operation of the rectifier, i. e., when the arc is flowing from the anodes to the cathode, assuming that an arc is flowing from anode 11 to the cathode 12, current flows from the line 1 through the transformer 2, 3; an arc is burning between anode 11 and cathode 12 and direct current flows over bus bar 17 through the direct current consuming devices 18 and bus bar 16 back to the point of the transformer secondary winding 3. The coil of the relay associated with anode 11 is thus energized in one direction and the armature thereof is retained in a position determined by the stop 36.

If a cathode spot is formed on another anode such as anode 6 or if any other condition within the rectifier causes such disturbance therein as results in back-firing or a short circuit between anodes 11 and 6, current flows from line 1 through transformer 2, 3; and arc flows between anode 11 and anode 6 and current flows back to the neutral point of the transformer secondary winding 3 without flowing through the direct current circuit. The coil 23 of the relay associated with anode 6 is energized in the opposite direction from the energization of coil 24 and the armature 26 is moved in a direction to cause closing of contacts 31 against the action of spring 33. Closing of contacts 31 connects condenser 37 with anode 6 and the condenser discharges in a direction opposing the flow of current from the anode 6 to the transformer 2, 3 thus interrupting the arc between anodes 11 and 6. The arc flowing from the anode 11 is thus quenched, but is immediately picked up again providing the usual excitation anodes (not shown) within the rectifier are in operation. The actual interruption of rectifier operation upon the occurrence of a back-fire or short circuit is thus at the most not more than one cycle.

In the modified embodiment of the invention shown in Figure 2 the condenser 37 is charged by the voltage across the direct current bus bars 16 and 17. The condenser is connected with the direct current line by means of a relay 42 which is deenergized when the arcs within the rectifier are flowing from the anodes to the cathode. during such normal operation only a predetermined current is flowing in the primary winding 2 of the supply transformer. The coil of the relay 42 is energized through a current transformer 43 and the relay is actuated to close its normally open contacts upon the occurrence of any conditions within the rectifier such as a back-fire or short circuit which causes an overload on the primary transformer winding 2. Closure of the normally open contacts of relay 42 connected condenser 37 with the movable member of contacts 31 and 32 and reversal of direction of current flow in any of the anode connections with the supply transformer 2, 3 causes operation of the relays connected therewith. The condenser is thus discharged to quench the back-firing or short circuiting arc within the rectifier whereupon the rectifier may resume normal operation.

Although but a few embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. In an electric current rectifying system, an electric current rectifier of the metallic vapor arcing type having anodes and a cathode, a direct current circuit supplied by said rectifier, a condenser connected with said circuit, means for charging said condenser, and means associated with each of the anodes of said rectifier for connecting said condenser for discharge through an anode upon the occurrence of a reverse flow of current therethrough.

2. In an electric current rectifying system, an electric current rectifier of the metallic vapor arcing type having anodes and a cathode, a direct current circuit supplied by said rectifier, a condenser connected with said circuit, means for charging said condenser, and a polarized relay connected with each of the anodes of said rectifier for connecting said condenser to the associated anode to discharge therethrough upon the occurrence of a reverse flow of current therein.

3. In an electric current rectifying system, an electric current rectifier of the metallic vapor arcing type, a direct current circuit supplied by said rectifier, a condenser connected with said circuit, a valve connected with said condenser, a transformer supplying a potential to said valve to cause charging of said condenser, and a polarized relay connected with each of the anodes of said rectifier for connecting said condenser to the associated anode to discharge therethrough upon the occurrence of a reverse flow of current therein.

4. In an electric current rectifying system, an electric current rectifier of the vapor arcing type subject to reverse flow of current therein, a direct current circuit supplied by said rectifier, a condenser connected across said circuit to be charged therefrom, a plurality of means cojointly actuated responsive to and upon occurrence of said reverse flow of current to establish circuit for discharge of said condenser through said rectifier in direction to interrupt said reverse flow of current, the actuation of one of said means operating to interrupt the said connection of said condenser across said circuit.

ARTHUR GAUDENZI.